United States Patent [19]

Silverstein

[11] Patent Number: 4,515,233
[45] Date of Patent: May 7, 1985

[54] UNIVERSAL AUTOMOTIVE BATTERY HOLDDOWN SYSTEM

[76] Inventor: Joseph D. Silverstein, 51 Sagebrush La., S. Hauppauge, N.Y. 11722

[21] Appl. No.: 420,039

[22] Filed: Sep. 20, 1982

[51] Int. Cl.$^3$ .............................................. B62D 25/00
[52] U.S. Cl. .................................... 180/68.5; 24/278; 24/68 CT; 269/130; 410/103; 410/99; 410/100
[58] Field of Search .............. 180/68.5; 269/130–132; 248/503, 505; 410/10, 11, 21–23, 41, 47–50, 96–100, 103; 24/276, 278, 68 CD, 68 CT; 254/100

[56] References Cited

U.S. PATENT DOCUMENTS

| | | | |
|---|---|---|---|
| 3,412,692 | 11/1968 | Evans | 410/99 |
| 3,462,137 | 8/1969 | Grube | 410/41 |
| 4,013,300 | 3/1977 | Berger | 180/68.5 X |
| 4,117,963 | 10/1978 | Luczynski | 410/48 X |
| 4,367,572 | 1/1983 | Zielenski | 410/97 X |

FOREIGN PATENT DOCUMENTS

| | | | |
|---|---|---|---|
| 8259 | of 1927 | Australia | 24/278 |
| 21066 | of 1910 | United Kingdom | 24/278 |

Primary Examiner—Joseph F. Peters, Jr.
Assistant Examiner—Michael Mar
Attorney, Agent, or Firm—Leonard Belkin

[57] ABSTRACT

A universal automotive battery holddown system employing a chain or a cable stretched over a bracket placed on one edge of the battery. The bracket carries a bolt with a nut over which the chain or cable is placed. When the ends of the chain or cable are attached to the chassis or body of the vehicle and the platform on which the battery is located, the nut on the bolt is rotated until the chain or cable is taut, thereby securing the battery. The system can be used for any size or shape battery.

3 Claims, 5 Drawing Figures

UNIVERSAL AUTOMOTIVE BATTERY HOLDDOWN SYSTEM

BACKGROUND OF THE INVENTION

This invention relates to a universal automotive battery holddown system and more particularly to a simple system which is suitable for use in almost any vehicle for clamping any battery in place, including a battery which is of non-standard size.

When an automobile, truck, or other self-propelled vehicle is manufactured, there is usually provided a battery and a mounting arrangement for that battery, the mounting arrangement being designed to accommodate only the size battery designated as original equipment for that vehicle.

During the life of the vehicle, when the battery needs replacement, this is ordinarily accomplished by substituting a new battery for the old one, having the same physical dimensions so that the mounting hardware of the vehicle can accommodate the new battery.

There are times, however, when some of the mounting hardware in the vehicle is damaged to the extent it can not be used, or has been lost or stolen so that it is not convenient, or in some cases not possible if the car is old enough, to replace the hardware.

At other times, it may be desirable or necessary to substitute a battery having different dimensions not capable of being accommodated by the mounting hardware present in the vehicle. This could occur when it is desired to provide a substitute battery which has a different power rating not supplied in the same size, or where the replacement battery is taken from another vehicle, or in some cases, where the proper size battery is not available or in supply, and a replacement must be made, as for example, while on the road.

For the aforementioned and other possible reasons, it may not be practical to replace the existing battery with another having the same or similar dimensions, or the existing clamping apparatus may not be capable of being used. In such cases, it would ordinarily be necessary to rig up a temporary or other less than permanent or satisfactory arrangement to support the battery. Since automobile batteries contain a highly corrosive acid, it is seen that such arrangements could be dangerous, and in any event it is a very inconvenient way of dealing with the problem.

Existing battery holddown devices rely heavily on the base or platform for the battery built into the body of the vehicle. This is illustrated in U.S. Pat. Nos. 2,849,074, 2,853,143, 2,994,395, 3,125,177, 3,333,810, and 3,866,704. It will be seen, also, that some if not all of the above patented devices are capable of accommodating only a small range of battery dimensions, but none of them is useful with a battery having a major difference in shape or size, and furthermore, the elements of the holding systems are so specialized that if some part is missing then it is difficult if not impossible to use properly what is left to support the battery.

SUMMARY OF THE INVENTION

In the present invention the problems described above are overcome by providing a universal battery holddown system which is capable virtually of simply, economically, and reliably supporting a battery anywhere there is a platform of place on which to place it. The platform for the support of a battery in an automobile is usually placed adjacent to some body member and has a rim to prevent the battery from sliding off.

In a preferred embodiment of this invention, a single L-shaped member is provided with a bolt mounted thereon. The member in use straddles one edge of the battery. An elongated flexible member, such as a chain, is draped across said L-shaped member, engaging said bolt, and hooked or clamped at or near the ends thereof to the platform at one end and to a body member at the other end. In the event there is no adjacent body member, both ends of the flexible member could be attached to the platform.

A nut threaded on said bolt is provided to be rotated so as to render the extended member taut and so retain the battery firmly and securely in place.

It is thus a principal object of this invention to provide a battery holddown system for use in automobile and similar vehicles which is capable of being used with a wide range of battery sizes, is simple and inexpensive in construction, easy to use, and is reliable and effective.

Other objects and advantages of this invention will hereinafter become obvious from the following description of preferred embodiments of this invention.

DESCRIPTION OF THE PREFERRED EMBODIMENTS

Figure 1:
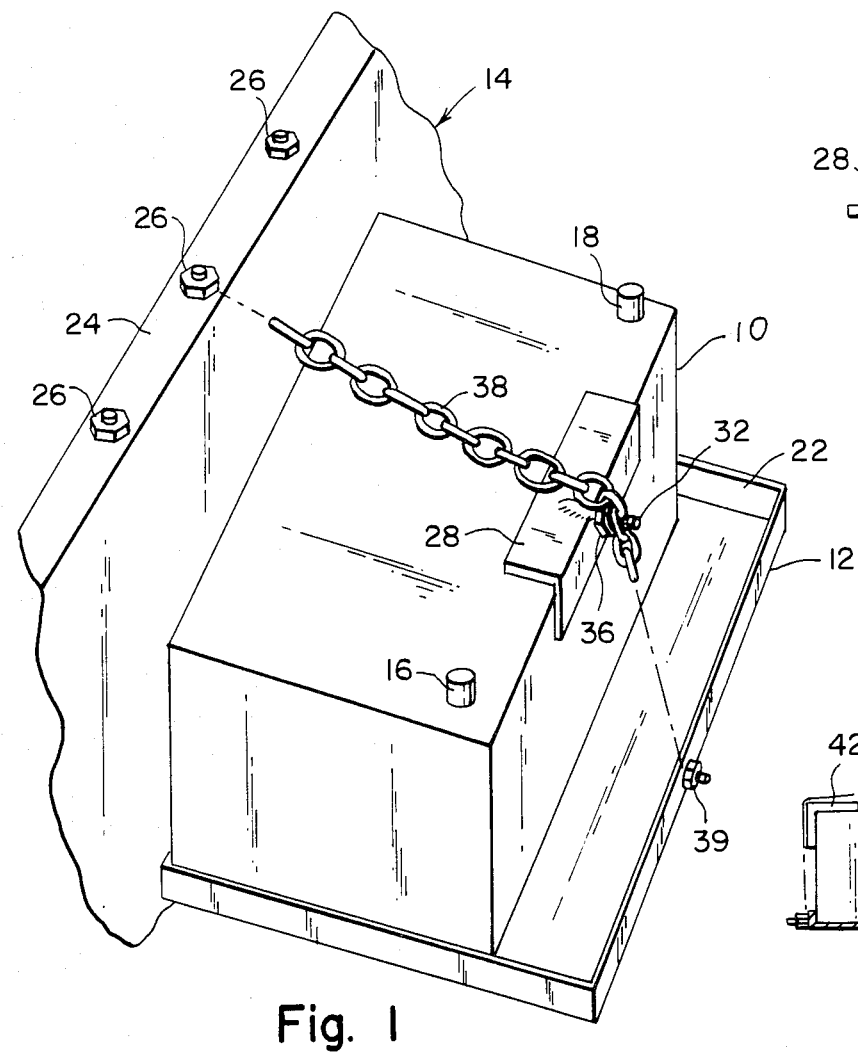
FIG. 1 is an isometric view of a battery clamped in place utilizing a preferred embodiment of this invention.

Referring to FIG. 1, there is illustrated a battery 10 placed on a platform 12 located in a vehicle 14 which may be either an automobile, truck, or other motorized vehicle in which battery 10 may be employed.

Battery 10 is provided with anode and cathode terminals 16 and 18, respectively. Not shown are the cables and clamps which would be attached to the terminals when battery 10 is connected up for service.

Platform 12 is horizontal and is provided typically with a rim 22.

Only a small body section 24 of vehicle 14 is illustrated. Section 24 might be part of the front or rear quarter panel rimming the engine compartment and might be provided, for example, with body nuts and bolts 26.

To secure battery 10 on platform 12 in accordance with the principles of this invention there is provided an L-shaped member or bracket 28 located or straddling an upper edge of battery 10 on the side opposite the side abutting rim 22 or quarter panel 24, depending on the construction of platform 12 or its exact location.

Figure 2:
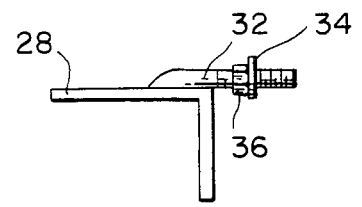
FIG. 2 is a side view of the bracket being used in FIG. 1.

As best shown in FIG. 2, bracket 28 is provided with a threaded bolt 32 welded or otherwise attached at one end to the former and extending outwardly from the bend. On bolt 32 is a washer 34 and a threaded nut 36. Referring back to FIG. 1, it will be seen that a chain 38 is draped over bracket 28 so that one link of chain 38 is looped on bolt 32. One end of chain 38 is attached to one of the body nuts and bolts 26. The nut would be removed, a link of chain 38 placed on the bolt, and the nut replaced, tightening the end of chain 38 in place.

The other end of chain 38 would be attached in any convenient fashion to platform 12, such as a nut and bolt assembly 39. This can be done in any suitable way. For example, an existing nut and bolt could be employed. If a hole is present, or if one can be drilled, one of the links of chain 38 can be opened and hooked on the opening. Chain 38, if desired, can be extended past platform 12 to some other place within the compartment which will have the effect of holding bracket 28 against battery 10.

In the use of the clamping apparatus shown in FIGS. 1 and 2, battery 10 is placed on platform 12 up against one side of the latter, close to some part of the vehicle body. Bracket 28 is placed on one edge of battery 10 on a side remote from the side up against the rim of platform 12 or adjacent said part of the body. Bracket 28 can be oriented with bolt 32 extending either horizontally or vertically. One end of chain 38, which can either be the link or some other link near the end is attached to some point or platform 12 or some point on the body at a point near or at the bottom of battery 10.

Chain 38 is then pulled up over bracket 28 with one of the links becoming engaged to bolt 32. Nut 36 with its washer 34 should be in a position where they are threaded close to the anchored portion of bolt 32. While 38 is pulled reasonably tight and attached at or near its other end to one of the body bolts 26, it is evident that battery 10 will not remain reasonably secure. However, rotation of nut 36, preferably with the use of a wrench, in the direction of moving the former outwardly on bolt 32, to make chain 38 very taut will result in battery 10 becoming very securely attached to its platform.

In the event platform 12 is not located where it is convenient to attach one end of chain 38 to a point on the body of the vehicle, it is possible, utilizing the principles of this invention, to attach both ends of chain 38 to the platform.

Figure 3:
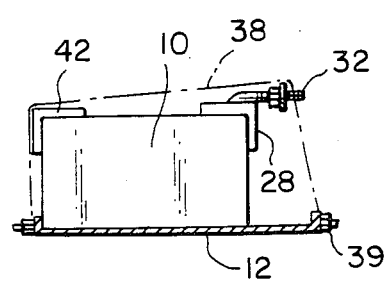
FIG. 3 is an elevation view of the battery in an alternative holddown scheme.

This arrangement is illustrated in FIG. 3 in which battery 10 is on platform 12 and bracket 28 carrying bolt 32 is on one edge of the latter. A second bracket 42 is located on an opposite edge of battery 10 and chain 38 is connected at both ends to platform 12.

Figure 4:
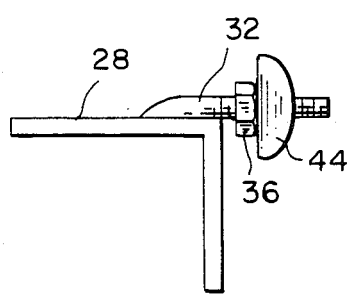
FIG. 4 shows a guide mounted for use with a cable.
Figure 5:
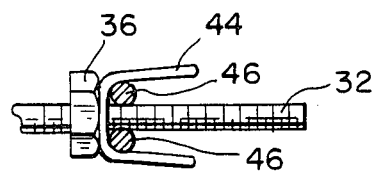
FIG. 5 is a plan view of the guide illustrated in FIG. 4.

While a chain is illustrated as being utilized to strap battery 10 in place, it is apparent that other types of flexible elements could be employed, such as a metal cable. Where a cable is employed some other provision must be made to link nut 36 to the former. In this case, as illustrated in FIGS. 4 and 5, nut 36 would be provided with a guide 44 to act as a retaining guide for cable 46. The latter could be folded and the looped end placed under nut 26 and drawn through guide 44 on both sides of bolt 32. The free ends of cable 46 would be attached in convenient fashion to bolt assembly 39.

It is thus seen that there has been provided a universal automotive battery holddown clamping apparatus which is capable of being utilized for virtually any size battery and location. An important advantage of this invention is that it is not necessary for a garage which services batteries to maintain in stock a large inventory of battery holddown devices. A device which incorporates the principles of this invention is capable of meeting almost any forseeable situation and hence its use will effect savings by reducing inventory requirements.

Furthermore, a clamping device of the type herein described and claimed is simple in construction and easy to use. It also can be stored in a very small package and so takes up very little room.

It is understood that the parts comprising this invention would, prior to use, be assembled and made available in the form of a kit. Such a kit, for example, in one embodiment, would consist of an L-shaped bracket with the threaded bolt attached, a nut and washer, and the elongated, flexible member. If the latter were a cable instead of a chain, then of course there would be provided a guide for use on the bolt. A second bracket could be supplied for the alternative tie-down scheme described.

While only certain preferred embodiments of this invention have been described, it is understood that many variations thereof are possible without departing from the principles of this invention.

What is claimed is:

1. In a motorized vehicle, apparatus for clamping in place a battery resting on a platform secured to a vertical body portion of said vehicle, said battery abutting one side of said platform comprising:
   a. means for straddling one upper edge of said battery opposite the abutting side of said battery;
   b. means for retaining said battery securely in place on said platform comprising a single, elongated, flexible member, one end of said member being attached to one edge of said platform on the same side of said battery as said straddling means, the other end of said member being attached to a point on the body portion of said vehicle spaced above said battery and located such that said elongated member passes over said straddling means; and
   c. means on said straddling means for engaging said elongated member and including means for rendering said elongated member taut so as to maintain said battery firmly and securely in place, said straddling means being an L-shaped bracket mounted on said edge of said battery, and said engaging means comprising a threaded bolt fixedly connected at one end to the top of said bracket and extending horizontally past the edge of said bracket, and a nut thereon for contacting said elongated member, said elongated member straddling said bolt and being rendered taut by the rotation of said nut outwardly along said bolt.

2. The apparatus of claim 1 in which said elongated member is a chain having links, one of said links being engaged with said bolt.

3. The apparatus of claim 2 in which said elongated member is a cable and said bolt is provided with a guide to maintain said cable in relation to said bolt so as to permit rotation of said nut to cause said cable to become taut.

* * * * *